Sept. 22, 1959 R. A. HAYES 2,905,653
ORIENTED PRODUCTS FROM GRAFT COPOLYMERS OF
VINYL ESTER ON ACRYLONITRILE POLYMER
Original Filed Aug. 4, 1953
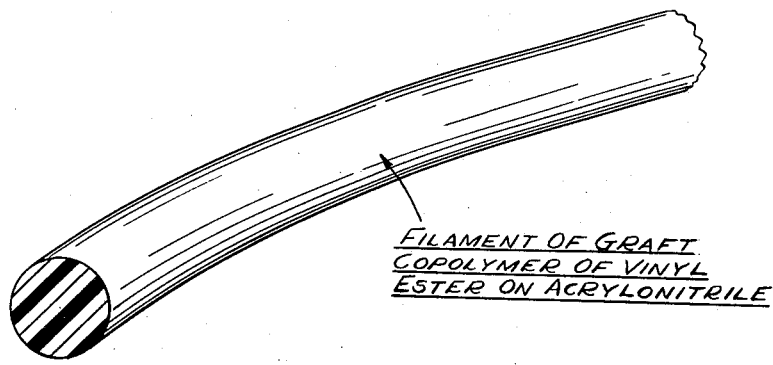
FILAMENT OF GRAFT
COPOLYMER OF VINYL
ESTER ON ACRYLONITRILE
INVENTOR.
ROBERT A. HAYES
BY
W. A. Fraser
ATTY.

2,905,653
ORIENTED PRODUCTS FROM GRAFT COPOLYMERS OF VINYL ESTER ON ACRYLONITRILE POLYMER

Robert A. Hayes, Cuyahoga Falls, Ohio, assignor to The Firestone Tire & Rubber Company, Akron, Ohio, a corporation of Ohio Continuation of application Serial No. 372,390, August 4, 1953, which is a continuation of application Serial No. 304,213, August 13, 1952. This application May 14, 1957, Serial No. 659,167

4 Claims. (Cl. 260—45.5)

This invention relates to oriented products (and more particularly filaments) formed from graft copolymer of vinyl ester on acrylonitrile polymer, preferably produced by emulsion polymerization. The vinyl ester is an ester of a saturated monocarboxylic acid having not more than about eight carbon atoms.

The oriented filaments and other products have good tensile strength and water sensitivity, and have low shrinkage when heated. Their surface homogeneity and water sensitivity render them particularly suited for dyeing.

By "graft copolymer" is meant a high polymer produced by polymerization of acrylonitrile with subsequent polymerization of a vinyl ester thereon by chain transfer, at least a certain portion of the vinyl ester being chemically bound to the polyacrylonitrile, Journal Polymer Science, II, pages 531 to 537, 1953.

The homopolymer of acrylonitrile, i.e. polymer composed one hundred percent of acrylonitrile, is unsatisfactory for fabrics and possibly other uses such as films, etc., because of its resistance to water. A copolymer in which vinyl ester of a monocarboxylic acid has been used is more water sensitive, but such a copolymer has a relatively low softening temperature and the oriented products have such a high shrinkage when heated that they are not suited for use in clothing fabrics. Blends of polyacrylonitrile and polyvinyl esters of monocarboxylic acids, after orienting, are relatively resistant to shrinkage when heated, but such products are not clear. They are translucent and may be almost opaque. Furthermore, blends are not homogeneous and do not accept dyestuffs uniformly.

The acrylonitrile polymers used in forming the graft copolymers of this invention may be homopolymers. Acrylonitrile polymers which contain about ten percent of a monomer that gives improved solubility may be used. The amount of such monomer used is kept low in filaments for clothing, etc., because the acrylonitrile polymers formed with them do not have the high softening temperature and low shrinkage of the homopolymer, the deterioration in these properties being proportional to the amount of the monomer employed. Any acrylonitrile polymer suitable for filament manufacture may be used in producing the graft copolymer of this invention. It may, for example, be formed from acrylonitrile and 5 to 15 or up to 20 or 25 percent of monomer which contains an ethylenic linkage, such as vinyl acetate, vinyl chloride, vinyl pyridine, acrylic acid and its esters and amide and homologues thereof, styrene, isobutene, isobutylene, and butadiene, as well as other vinyl and acrylic compounds, other olefinic or diolefinic hydrocarbons, etc., and polymers of such substances.

The low solubility of acrylonitrile polymers in the common organic solvents makes it difficult to produce copolymers by solution polymerization, bulk polymerization, or suspension polymerization. It is therefore preferred to produce the graft copolymers by emulsion polymerization.

The acrylonitrile polymer onto which the vinyl ester is grafted may be of any molecular weight. However, for fabrication into filaments the polymer employed will ordinarily be about of the molecular weight of the polymers and copolymers now employed commercially for such purpose.

The grafting is preferably carried out upon an acrylonitrile polymer in the form of latex produced in water emulsion. A water-soluble anionic emulsifier will be employed in the production of the latex, and there are many of these on the market which may be used.

Because of the peculiar polymerization behavior of acrylonitrile, a relatively large amount of water will be required, and the latex of the grafted copolymer will not have as high a solids content as is ordinarily considered desirable in a commercial latex, because of the large amount of water required. Generally the solids content of the polymerizing aqueous mass will be about 15–20 percent or somewhat higher, although lower concentrations may be used.

The invention will be illustrated with reference to the production of certain graft copolymers from a particular acrylonitrile polymer emulsion, but the invention is not limited thereto. Although the example refers to grafting vinyl acetate on to a polymer obtained in a reaction carried to substantially 100 percent conversion, the polymers produced by stopping the reaction short of 100 percent conversion are as satisfactory for the production of graft copolymers as those obtained by 100 percent conversion.

Although one might use up to as much as 50 percent by weight of the vinyl ester (based on the weight of the end product) in producing the graft, the graft copolymers will ordinarily contain in the range of 15 to 20 percent, or perhaps 10 to 25 percent, of the vinyl ester, based on the weight of the end product.

It is thought, without absolute commitment to this theory, that the vinyl ester becomes bound to the base polymer by a chain-transfer process, probably involving the hydrogen atom which is alpha to the nitrile group. However, applicant does not wish to be bound by this theory.

The emulsion of acrylonitrile polymer may be obtained in any desired manner, and will ordinarily be the latex produced by emulsion polymerization of acrylonitrile. The following is illustrative:

EXAMPLE

*Polymer formula*

| | Parts by weight |
|---|---|
| Acrylonitrile | 70 |
| Water | 440 |
| Potassium persulfate | 0.17 |
| Dedecyl mercaptan | 0.6 |
| Sodium lauryl sulfate | 1.7 |

The polymerization was carried out at 60° C. for four hours, and 96 percent conversion was obtained.

The graft copolymer of the vinyl ester on the acrylonitrile polymer is produced in emulsion. No catalyst is required, although ordinarily a catalyst will be employed to speed up the reaction. Any aqueous emulsion polymerization catalyst may be employed such as a water-soluble peroxide catalyst as, for example, potassium persulfate, hydrogen peroxide, ammonium persulfate, etc. A diazo catalyst may be used such as azoisobutyronitrile, etc. Alternatively, a Redox catalyst may be employed such as cumene hydroperoxide and iron.

The temperature of the reaction controls, at least to some extent, the amount of the ester which is grafted on to the acrylonitrile polymer from any particular emulsion system. Ordinarily temperatures of at least 40° C. will be employed in commercial operations. Temperatures may be employed up to the boiling point of the emulsion, or higher if suitable pressure vessels are used.

As illustrative of the graft copolymerization, graft copolymers were made from the foregoing latex by adding vinyl acetate and potassium persulfate to the polyacrylonitrile emulsion according to the following formulae:

*Graft copolymer formulae*

|  | Sample A | Sample B | Sample C |
|---|---|---|---|
| Polyacrylonitrile (dry weight)........g.. | 80 | 60 | 40 |
| Vinyl acetate........................g.. | 20 | 40 | 60 |
| Potassium persulfate................g.. | 1.0 | 1.0 | 1.0 |

The grafting of the vinyl acetate to the acrylonitrile polymer was carried out at 70° C. for two hours. The resulting latexes were coagulated with aqueous calcium chloride solution. The respective graft copolymers were filtered off, washed with water, and dried in an oven at 50° C. The yield in each case was 98 to 100 grams.

Water adsorption tests were conducted at different temperatures according to A.S.T.M. specification D570–42, except that they were conducted on film instead of molded pieces. The films were cast on cold glass plates from solutions of these three graft copolymers in dimethyl formamide, and then immediately put in an oven at 60° C. The results are recorded in the following table together with the results of tensile and shrinkage tests now to be described.

Oriented films were prepared by cutting narrow strips from the cast films and stretching at elevated temperatures to produce films ten times the length of the original films. Measured lengths of the oriented films were immersed in boiling water for ten minutes and were then remeasured to determine the shrinkage.

The tensile strengths of the oriented films were determined and averages of from four to five tests determined. The figures given refer to pounds per square inch.

The results of all these tests are given in the following table. The different graft copolymers are identified by the same sample designation used in connection with the preparation of the polymers. The composition of each sample is indicated by the use of AN and VA to refer to its percentage content of acrylonitrile polymer and vinyl acetate graft.

*Table of test results*

|  | Sample A | Sample B | Sample C |
|---|---|---|---|
| Composition (AN/VA).............. | 80/20 | 60/40 | 40/60 |
| Water adsorption at— |  |  |  |
| 25° C...................percent.. | 6.6 | 10.3 | 27.5 |
| 60° C......................do.... | 9.1 | 15.3 | 42.0 |
| 100° C.....................do.... | 12.3 | 23.0 | 46.1 |
| Tensile strength................... | 37,300 | 22,700 | 17,100 |
| Shrinkage in boiling water...percent.. | 12 | 12 | 15 |

In the commercial production of oriented filaments, the graft copolymer is first dissolved in a solvent such as one of the several solvents now employed for solution of acrylonitrile polymer, such as dimethyl formamide. Although the example refers more particularly to the graft copolymer formed with vinyl acetate it may be formed of the vinyl ester of any other saturated monocarboxylic acid having 1 to 8 carbon atoms in the acid chain, such as vinyl formate, vinyl propionate, vinyl t-butyrate, vinyl 2-ethylhexylate, etc. The solution is ordinarily dry spun or spun into a precipitating bath, and then stretched to obtain the desired tensile strength and other properties. Graft copolymer containing about 10 to 25, or more particularly 20 parts of vinyl acetate or other ester (based on the weight of the graft copolymer) is preferred for oriented fiber.

This application is a continuation of my application Serial No. 372,390, filed August 4, 1953, which in turn is a continuation of my application Serial No. 304,213, filed August 13, 1952. Both of said applications have been abandoned.

I claim:

1. A graft copolymer which is prepared by polymerizing a monomer material consisting of a vinyl ester, in an aqueous emulsion of polymeric material consisting of acrylonitrile homopolymer, the vinyl ester being a vinyl ester of a saturated monocarboxylic acid having 1 to 8 carbon atoms in the acid chain, and the copolymer containing substantially 10 to 25 percent of the combined ester based on the weight of the graft copolymer.

2. An oriented filament of the graft copolymer of claim 1 which filament has low shrinkage in boiling water.

3. A graft copolymer which is prepared by polymerizing a monomer material consisting of vinyl acetate, in an aqueous emulsion of polymeric material consisting of acrylonitrile homopolymer, the copolymer containing substantially 20 percent of the combined vinyl acetate based on the weight of the graft copolymer.

4. An oriented filament of the graft copolymer of claim 3 which filament has low shrinkage in boiling water.

References Cited in the file of this patent

UNITED STATES PATENTS

| 2,530,962 | Hare | Nov. 21, 1950 |
| 2,598,316 | Tawney | May 27, 1952 |
| 2,749,325 | Craig | June 5, 1956 |

FOREIGN PATENTS

| 999,594 | France | Oct. 3, 1951 |